Patented Nov. 2, 1948

2,453,089

UNITED STATES PATENT OFFICE 2,453,089

PROCESS FOR PRODUCTION OF HALOGENATED OLEFINS

Glen H. Morey and Robert F. Taylor, Terre Haute, Ind., assignors to Commercial Solvents Corporation, Terre Haute, Ind., a corporation of Maryland No Drawing. Application October 9, 1943, Serial No. 505,666

7 Claims. (Cl. 260—654)

Our invention relates to the production of chlorobromoolefins, and dibromo- and dichloro- olefins (to be hereinafter designated as dihalo- olefins). More particularly it relates to an improved procedure therefor, involving the utilization of temperature conditions and proportions of reactants that heretofore have been regarded either as inoperative or wholly impractical.

In the preparation of dihaloolefins such as the dihalobutenes, it has been customary to employ both liquid and vapor phase methods; however, neither of these procedures has met with unqualified success. The production of dihalobutenes, by liquid phase methods, has generally involved the addition of the halogen, i. e., bromine or chlorine, in a quantity insufficient for complete halogenation of butadiene in the presence of a solvent, such as carbon tetrachloride. Under these circumstances, it becomes necessary to employ relatively large volumes of solvents, and to work with a large excess of butadiene in order to prevent further halogenation of the dihalobutenes first formed. The yield of product per unit of space and time is accordingly very moderate, and the hydrogen halide formed by substitutive halogenation, which always occurs as a side reaction, is present in the solution and, by addition, tends to enhance the formation of undesired byproducts. Furthermore, the distillation which is required when the reaction has proceeded for a comparatively short period, in order to avoid a high concentration of the halogenated products, renders the process economically unsound because of the relatively large volume of solvents which is carried over, as well as other unavoidable losses that occur as a result of the distillation step. Although it has been asserted by the advocates of the aforesaid procedure that substantially quantitative yields of the isomeric dihalobutenes may be obtained, we have found, however, for example, that at practical concentrations it has been impossible to secure yields of the isomeric dichlorobutenes, which substantially exceed 45 per cent, even when operating at temperatures as low as —50° C. Under such conditions, we have observed that the reaction was always accompanied by the vigorous evolution of much hydrogen chloride, indicating that undesirable competing reactions were simultaneously occurring, and that upon distillation of the final reaction mixture, a substantial proportion thereof always remained in the still as a black, tar-like and intractable residue. Chlorination of the liquid butadiene at temperatures as low as —70° C., when employing the method generally outlined above, resulted in only 10 per cent of the theoretical amount of dichlorobutenes.

The vapor phase methods for the preparation of the dihalobutenes have been based upon a procedure involving the halogenation of butadiene in the presence of an inert gas, the latter being preferably nitrogen, at temperatures ranging from about —20° C. to +20° C. It has been our observation, however, that the presence of such gaseous diluents adversely affects the yields of dihalobutenes obtainable. Furthermore, the reaction chamber utilized in carrying out the vapor phase reaction, in accordance with the prior art, was either partially or entirely charged with a filling material which, in view of our findings in regard to the effect of surface on the yield of dihaloolefins, is not at all desirable.

Other workers in this field have investigated reactions of a similar nature relating to the halogenation of various unsaturated hydrocarbons at relatively high temperatures, i. e., from about 240 to 350° C., in the presence of oxygen. For example these investigators, when working with chlorine, found that within specified limits, an increase in oxygen content decreased the addition of chlorine to double bonds, but promoted the substitution of chlorine for hydrogen in the hydrocarbon molecule. Thus, for example, when ethylene was chlorinated in the vapor phase and in absence of oxygen, the reaction products were found to predominate in ethylene dichloride; but when the same reaction was effected in the presence of oxygen, the latter being present in concentrations lying within the specified range, vinyl chloride was found to be the chief product formed. Also, in the latter case, the volume of hydrogen chloride, simultaneously produced, was observed to be considerable, denoting that the reaction occurring was one of a substitutive character, rather than of an additive character.

More recently, a process has been developed for the production of dihalomonoolefins by the halogenation of the gaseous diolefin at temperatures ranging from about 150° C. to 300° C. In this process, the halogen and diolefin are separately heated to a predetermined temperature and then mixed in a suitable reaction chamber in a ratio of at least 2 moles of diene to 1 of chlorine, and preferably of about 4 moles of diene to 1 of chlorine. The minimum temperature at which the process is carried out, is defined as the temperature at which no liquid phase or liquid film is present in the zone of halogenation. It is obvious that the commercial application of such a procedure as that just described would entail considerable expense of operation, as well as offering highly complicated problems in regard to proper temperature control.

Contrary to that which would normally be expected in view of the teachings of former investigators, we have discovered that diolefins may be readily and economically converted to the isomeric dihaloolefins by halogenating the diolefin in the vapor phase at temperatures below the boiling point of the lowest boiling halogenated product produced. In general, the operative temperature range will be found to vary from about 60° to a temperature slightly below the boiling point of the lowest boiling halogenated product produced; however, we have ordinarily found it preferable to carry out the reaction at temperatures ranging from 70° to 80° C. Since the reaction is carried out at a temperature below the boiling point of the lowest boiling chlorinated product, which in the case of butadiene happens to be 3,4-dichloro-1-butene (B. P. 115° C. at 760 mm.), the desired dichlorobutenes, to-wit: 3,4-dichloro-1-butene and 1,4-dichloro-2-butene (B. P. 145° C. at 760 mm.) condense and are collected in a suitable receiver from which they may be intermittently withdrawn and purified by means of fractional distillation under vacuum. As a result of the utilization of such temperature conditions, it is possible to effect the halogenation in the presence of a liquid film of reaction product, which will be observed to collect on the walls of the reaction chamber, as well as on the lower extremities of the jets from which the gaseous reactants issue.

Although the relative molar proportions of halogen to diolefin may vary from about 0.80 to 1.3, we prefer to employ the halogen and diolefin in a molar ratio of approximately 1.0 to 1.25. Where larger or smaller proportions of halogen are employed than those first specified above, the yield of the desired halogenated olefin will be observed to drop off sharply. The reaction here involved, under such conditions, is predominantly one of addition; however, substitution occurs to some degree as a side reaction. The extent to which the latter takes place can be ascertained by measuring the quantity of hydrogen halide liberated. This phenomenon is exactly opposite of the results reported by former investigators; i. e., under the conditions previously employed, halogenation was effected principally by substitution and additive halogenation was a side reaction.

It will be apparent to those skilled in the art that our process may be carried out with various types of apparatus, such as, for example, those formerly employed for chlorinating hydrocarbons in the vapor phase. However, we have found it unnecessary, and in fact detrimental, to utilize reactors filled with porous materials, since under such conditions the dihaloolefins produced appear to be more readily converted to undesirable higher halogenated products. The material out of which the apparatus is constructed may be any of several common construction materials adapted to the type of chemical reaction here involved, such as, for example, glass, earthenware, nickel and the like. In general, it is desirable to employ apparatus constructed of material that does not have an adverse catalytic effect upon the reaction, or which is not attacked by any of the reactants. However, if for economic or other reasons it becomes necessary or desirable to utilize apparatus constructed of materials such as iron, stainless steel, or the like, which have an adverse effect on the reaction, we have found that this undesirable condition can be obviated by continuously washing the walls of the reactor with a liquid substance that is substantially inert with respect to the reactants and reaction products. Examples of liquids suitable for this purpose are carbon tetrachloride, chloroform, the halogenated products produced by the process of our invention, and the like.

In connection with the type of apparatus utilized, it should be mentioned that in order to secure maximum yields of dihaloolefins, the reaction chamber should be sufficiently large in diameter to prevent appreciable contact of free halogen with the dihaloolefins condensing on the walls of said chamber, and which are in relatively close proximity with the zone of halogenation. It is desirable to observe this precaution since with reactors of smaller diameter, a certain amount of free halogen will react with the dihaloolefins adhering to the walls of the reaction chamber and convert them into more highly halogenated products, thus tending to materially reduce the yield of the desired dihalo compounds. In general, it may be said that substantially any halogenation apparatus of conventional design will be satisfactory which provides a suitable means whereby the gaseous reactants are quickly and completely mixed on entering the reactor. In the majority of instances we have found that this object may readily be accomplished by introducing the gaseous reactants separately through two jets, arranged in such a manner that the streams of halogen and gaseous diene impinge at an angle of approximately 90 degrees. Other suitable arrangements of these jets may be employed if necessary or desirable.

At this point it is to be clearly understood that while the description and examples appearing below only refer to the production of chloro and bromo derivatives of butadiene and isoprene, our invention is also applicable to the halogenation of other diolefins such as 1,4-hexadiene, cyclopentadiene, 2-methylpentadiene, cyclohexylbutadiene, their homologs and analogs as well as the conjugated dienes in general. It will of course be evident, however, that due to slight differences in the physical properties of the various types of compounds listed above, obvious modifications in the procedure outlined, when employing them, will be necessary.

EXAMPLE I

The apparatus used in this run consisted of a reaction chamber connected with a vertically-positioned water-cooled condenser, the lower end of which was attached to a receiving vessel. The reactor, or reaction chamber, consisted of a 2-liter spherical flask equipped with a flexible thermocouple well and two jets spaced approximately 1 cm. apart and arranged so that effluent gases impinged at 90 degrees. The jets, through which the chlorine and butadiene were introduced, were 0.5 mm. in I. D. The condenser employed was 25 mm. in I. D. and 70 cm. long. Butadiene and chlorine were introduced into the above-described apparatus at a rate of 0.5 mole per hour, and 0.6 mole per hour respectively. The temperature of the reaction chamber varied between 69° and 72° C. At the end of 4 hours, the flow of gaseous reactants was stopped and the apparatus flushed with air for 1 hour in order to sweep out all of the hydrogen chloride into the sodium hydroxide scrubber solution which was connected to the receiving vessel. The hydrogen chloride produced corresponded to 0.208 mole per mole of butadiene reacting. The liquid reaction product, which amounted to 262.3 g., was distilled at reduced pressure and the following fractions collected:

| | Grams |
|---|---|
| 3,4-Dichloro-1-butene | 88.1 |
| Intermediate | 2.3 |
| 1,4-Dichloro-2-butene | 93.3 |
| Residue | 63.1 |

The two dichlorobutenes and the intermediate mixture comprised 75.4 per cent of the theoretical amount of dichlorobutenes.

EXAMPLE II

The apparatus used was essentially the same as that described in Example I. Isoprene was vaporized by immersing a tube containing the same in boiling methanol. The gaseous isoprene thus formed was introduced into the reactor at a rate of 2 moles per hour, while chlorine was introduced at a rate of 2.2 moles per hour. The temperature of the chlorination zone throughout the reaction ranged from 71° to 76° C. At the end of 1½ hours, the run was stopped and the product (293.7 g.) was distilled at reduced pressure. The following principal products were isolated: 1-chloro-2-methyl-1,3-butadiene, 10.9 per cent; 1,4-dichloro-2-methyl-2-butene, 24.5 per cent. There was isolated a small quantity (approximately 5 per cent) of an intermediate fraction having the following properties: Boiling point 68° C. (100 mm.); chlorine content, calculated, 51.1 per cent; found, 51.1 per cent, density ($d_4^{20}$), 1.110; refractive index ($n_D^{20}$), 1.4528. The test for tertiary halogen was positive, and consequently the compound unquestionably has the following structure:

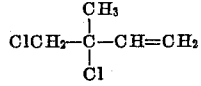

EXAMPLE III

The apparatus used was the same as previously described. Chlorine was passed through a wash bottle filled with bromine at 38° C. At this temperature, the vapor pressure of bromine is 0.5 atmosphere, and the effluent gas contained an equimolecular mixture of chlorine and bromine. The halogen mixture thus formed was introduced into the reactor at a rate of 0.86 mole per hour, while butadiene was introduced at a rate of 1.0 mole per hour. The temperature of the reactor throughout the halogenation varied between 73° and 77° C. The product, after halogenation was discontinued, was collected and distilled in the usual manner. In addition to the two dichlorobutenes which were obtained, two chlorobromobutenes were isolated and were found to have the following properties:

(a) 4-choloro-3-bromo-1-butene; boiling point,
60.5° C. (40 mm.); density ($d_4^{20}$), 1.5096; refractive index ($n_D^{20}$), 1.4994; molecular refractivity, calculated 32.837; observed, 32.99; molecular weight, calculated 169.5; observed 167.

(b) 1-chloro-4-bromo-2-butene, melting point 24°–27° C.; refractive index ($n_D^{27}$), 1.5347.

The table appearing below gives representative results obtained by chlorinating butadiene using varying temperatures and ratios of reactants.

| Chlorine/butadiene, mole ratio | Moles hydrogen chloride evolved/moles butadiene reacted | Butadiene recovered, per cent of input | Temp. range in reaction zone, ° C. | Yield of dichlorobutenes, per cent of theory |
|---|---|---|---|---|
| 0.95 | 0.206 | 13.2 | 71–76 | 71.8 |
| 1.00 | 0.192 | 9.0 | 73–75 | 70.3 |
| 1.04 | 0.194 | 6.3 | 69–70 | 74.7 |
| 1.08 | 0.182 | 4.5 | 69–71 | 70.9 |
| 1.12 | 0.210 | 3.0 | 68–74 | 78.9 |
| 1.22 | 0.208 | 1.1 | 65–73 | 77.5 |
| 1.25 | 0.222 | 1.4 | 61–74 | 72.4 |
| 1.32 | 0.238 | 2.0 | 66–74 | 65.0 |

It will, of course, be apparent that our process is applicable to the vapor phase halogenation of dienes generally. By the use of our invention, the solvent and gaseous diluents, employed in the liquor and vapor phase prior art procedures respectively, have been eliminated, as well as the relatively complicated and expensive apparatus, the use of which was necessary in carrying out such procedures. The resulting advantages from an economical standpoint in producing the dihaloolefins in accordance with our invention, will thus become apparent. Our process may be carried out with various forms of apparatus which provide an efficient means for rapidly and completely mixing the gaseous reactants, and numerous modifications may be made in the structure of the specific design of apparatus described herein. In general, it may be said that any modifications in our process, that would naturally occur to those skilled in the art, are included within the scope of our invention.

Our invention having been described, what we claim is:

1. In the halogenation of diolefins, the process which comprises intimately mixing a gaseous halogen and a gaseous conjugated diene in an unpacked reaction zone having a sufficiently large diameter to prevent appreciable contact of free halogen with the walls of said chamber, the gases being passed into said chamber in the ratio of from about 0.8 to 1.3 moles of halogen per mole of diene, the temperature within the reaction zone being maintained within a range extending from about 60° C. to a temperature slightly below the boiling point of the lowest boiling halogenated product produced in the process, and recovering the dihaloolefins produced in the process.

2. In the halogenation of butadiene, the process which comprises intimately mixing gaseous butadiene with chlorine in an unpacked reaction zone having a sufficiently large diameter to prevent appreciable contact of the chlorine with the walls of said chamber, the gases being mixed in the proportions of about 1 to 1.25 moles of chlorine per mole of the butadiene and the temperature within the reaction zone being maintained within a range extending from about 60° to 80° C. and recovering the dichlorobutenes produced in the process.

3. The process of claim 1, wherein the halogens utilized consist of an equimolecular mixture of chlorine and bromine.

4. The process of claim 1, wherein the halogen utilized is chlorine.

5. The process of claim 1, wherein the halogen utilized is bromine.

6. The process of claim 1, wherein the diene utilized is butadiene.

7. The process of claim 1, wherein the diene utilized is isoprene.

GLEN H. MOREY.
ROBERT F. TAYLOR.

REFERENCES CITED

The following references are of record in the file of this patent:

UNITED STATES PATENTS

| Number | Name | Date |
|---|---|---|
| 2,038,593 | Muskat | Apr. 28, 1936 |
| 2,299,477 | Hearne et al. | Oct. 20, 1942 |

FOREIGN PATENTS

| Number | Country | Date |
|---|---|---|
| 505,573 | Great Britain | May 12, 1939 |
| 518,697 | Great Britain | Mar. 5, 1940 |